United States Patent [19]

Grant

[11] Patent Number: 5,535,036
[45] Date of Patent: Jul. 9, 1996

[54] INPUT/OUTPUT MODULE PROVIDING MIXED OPTICAL AND ELECTRICAL SIGNAL CONNECTIVITY IN DATA COMMUNICATIONS EQUIPMENT

[75] Inventor: Robert E. Grant, Grass Valley, Calif.

[73] Assignee: Lighthouse Digital Systems, Inc., Grass Valley, Calif.

[21] Appl. No.: 374,946

[22] Filed: Jan. 18, 1995

[51] Int. Cl.[6] .................................................. H04B 10/00
[52] U.S. Cl. ............................................ 359/163; 385/31
[58] Field of Search .................................... 359/163, 109; 385/14, 15, 16, 31, 100, 88, 92, 89; 375/257

[56] References Cited

U.S. PATENT DOCUMENTS

| | | | |
|---|---|---|---|
| 4,732,446 | 3/1988 | Gipson et al. | 385/14 |
| 4,807,955 | 2/1989 | Ashman et al. | 385/88 |
| 5,091,991 | 2/1992 | Briggs et al. | 385/92 |
| 5,125,054 | 6/1992 | Ackley et al. | 385/14 |
| 5,199,087 | 3/1993 | Frazier | 385/14 |
| 5,337,391 | 8/1994 | Lebby | 385/88 |
| 5,396,573 | 3/1995 | Ecker et al. | 385/88 |

*Primary Examiner*—Leo Boudreau
*Assistant Examiner*—Bhavesh Mehta
*Attorney, Agent, or Firm*—Jenkens & Gilchrist

[57] ABSTRACT

An input/output module for use in a communications system including a plurality of interface cells, with each cell including circuitry for interfacing with either an optical or an electrical transmission media. An optical or electrical media connector, as needed, is connected to the interface circuitry. The input/output module further includes an inter-module connector for connecting the interface circuitry of the module to other similar modules or other circuit boards in the communications system. The disclosed input/output module is especially useful in a communications switch where a plurality of input/output modules are interconnected to each other through a crosspoint module.

8 Claims, 5 Drawing Sheets

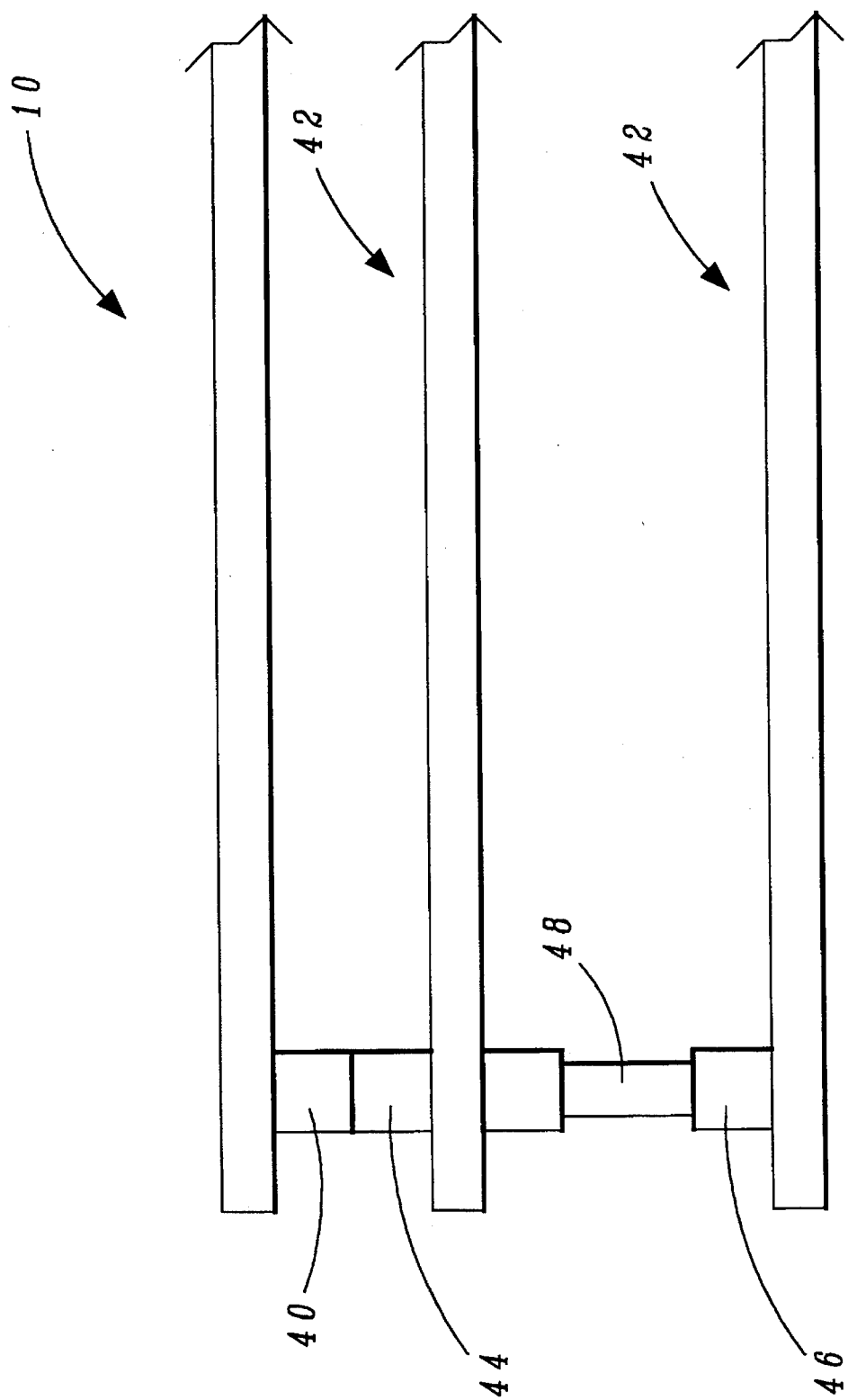

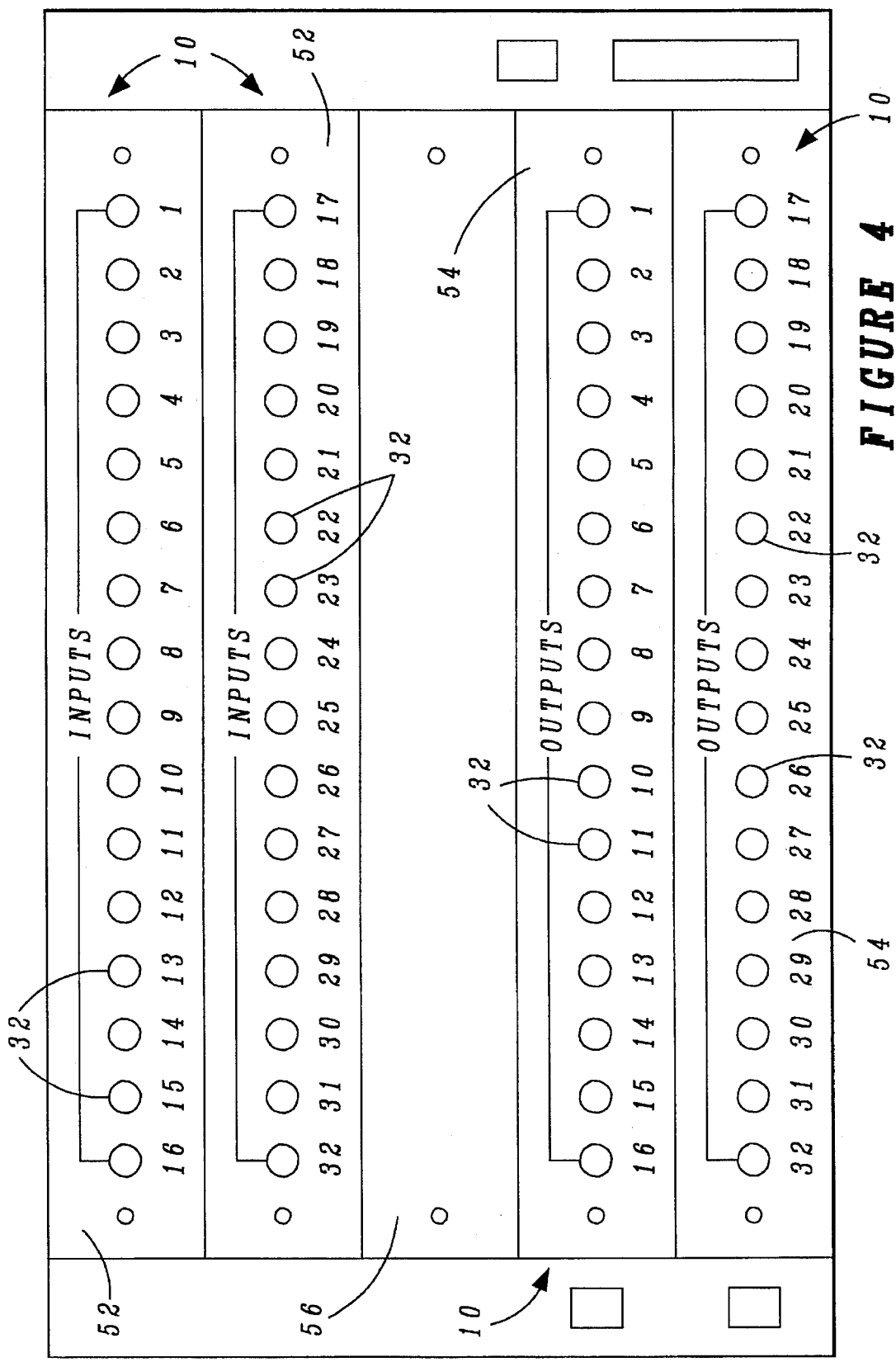

INPUT/OUTPUT MODULE PROVIDING MIXED OPTICAL AND ELECTRICAL SIGNAL CONNECTIVITY IN DATA COMMUNICATIONS EQUIPMENT

BACKGROUND OF THE INVENTION

1. Technical Field of the Invention

The present invention relates to data communications equipment and, in particular, to an input/output module providing both optical and electrical signal connectivity for interface use in communications equipment such as a router or switch.

2. Description of Related Art

The primary land-based signal transmission medium of the telephone/data communications system infrastructure is the copper wire transmission medium comprising, for example, a coaxial cable or a twisted wire pair. All communications signals, and in particular high speed digital signals, are more efficiently, accurately and consistently transmitted over an optical transmission medium such as a fiber optic cable. Accordingly, emphasis is currently being placed by communications providers on replacing copper wire cables with fiber optic cables.

Until replacement is completed and an all-fiber communications network is established, the communications system infrastructure must continue to facilitate the coexistence of the optical and electrical signal transmission media provided by fiber optic and copper wire communications links. One aspect of this coexistence is the conversion of digital communications signals between the optical pulses handled by the fiber optic media and the electrical pulses handled by the copper wire media. Another aspect of this coexistence is to provide for the switching (i.e., routing) of the optically transmitted digital signals carried by optical media to a desired destination over either optical or electrical media.

The conversion between optically and electrically transmitted signals is currently being performed by stand-alone fiber optic interface units that are installed separate from the other pieces of conventional electrical communications equipment that handles, for example, the switching of electrically transmitted signals. Such separate, stand-alone conversion units, however, inefficiently require extra space, power and cost. Accordingly, there is a need to incorporate the signal conversion functionality into certain pieces of communications equipment, and especially into communications system routers or switches.

SUMMARY OF THE INVENTION

To address the foregoing needs, the present invention provides an input/output module including mixed optical and electrical interface functionality. The input/output module includes a plurality of interface cells, with each cell including the requisite circuitry and a connector for interfacing with either an optical or an electrical transmission media such as a fiber optic or coaxial cable or an optical or electrical communications link. A circuit board supports the interface circuitry and connector for each of the included cells. The input/output module further includes a connector for interconnecting the module with other similar modules or circuit boards to integrate the module with other pieces of communications equipment or into communications systems. In one specific application, a plurality of the input/output modules of the present invention are interconnected to each other through a crosspoint module to form a communications switch capable of mixed handling of both fiber optic and wire carried optical and electrical communications signals, respectively.

BRIEF DESCRIPTION OF THE DRAWINGS

A more complete understanding of the input/output module of the present invention may be had by reference to the following Detailed Description when taken in conjunction with the accompanying Drawings wherein:

FIG. 3 is a side view showing the physical interconnection of a plurality of circuit boards by various means; and FIG. 4 is a rear view of the assembled communications system router of FIG. 2.

DETAILED DESCRIPTION OF EMBODIMENTS

Figure 1A:
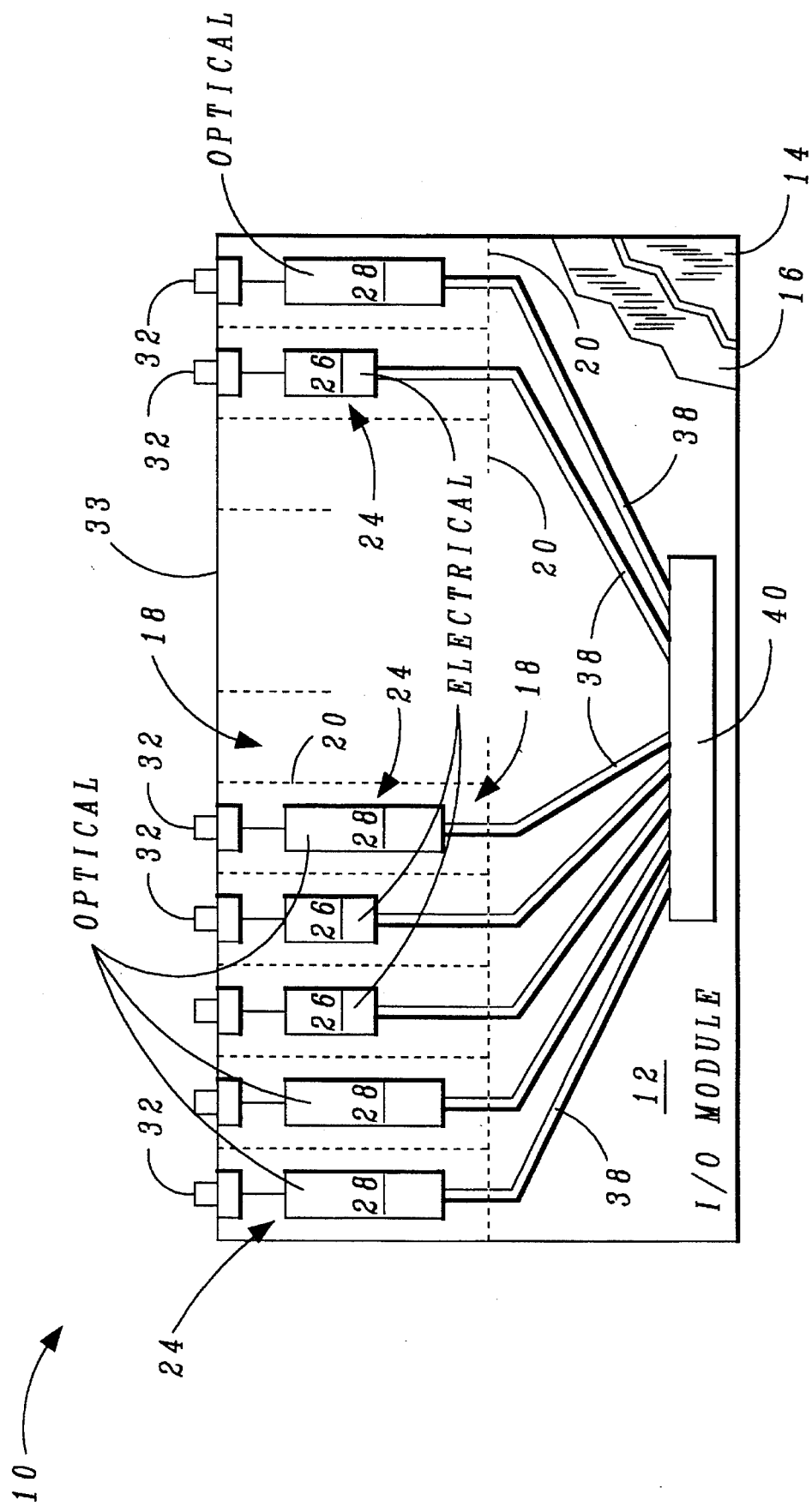
FIG. 1A is a top, partially broken away view of the circuit board for the input/output module of the present invention.
Figure 1B:
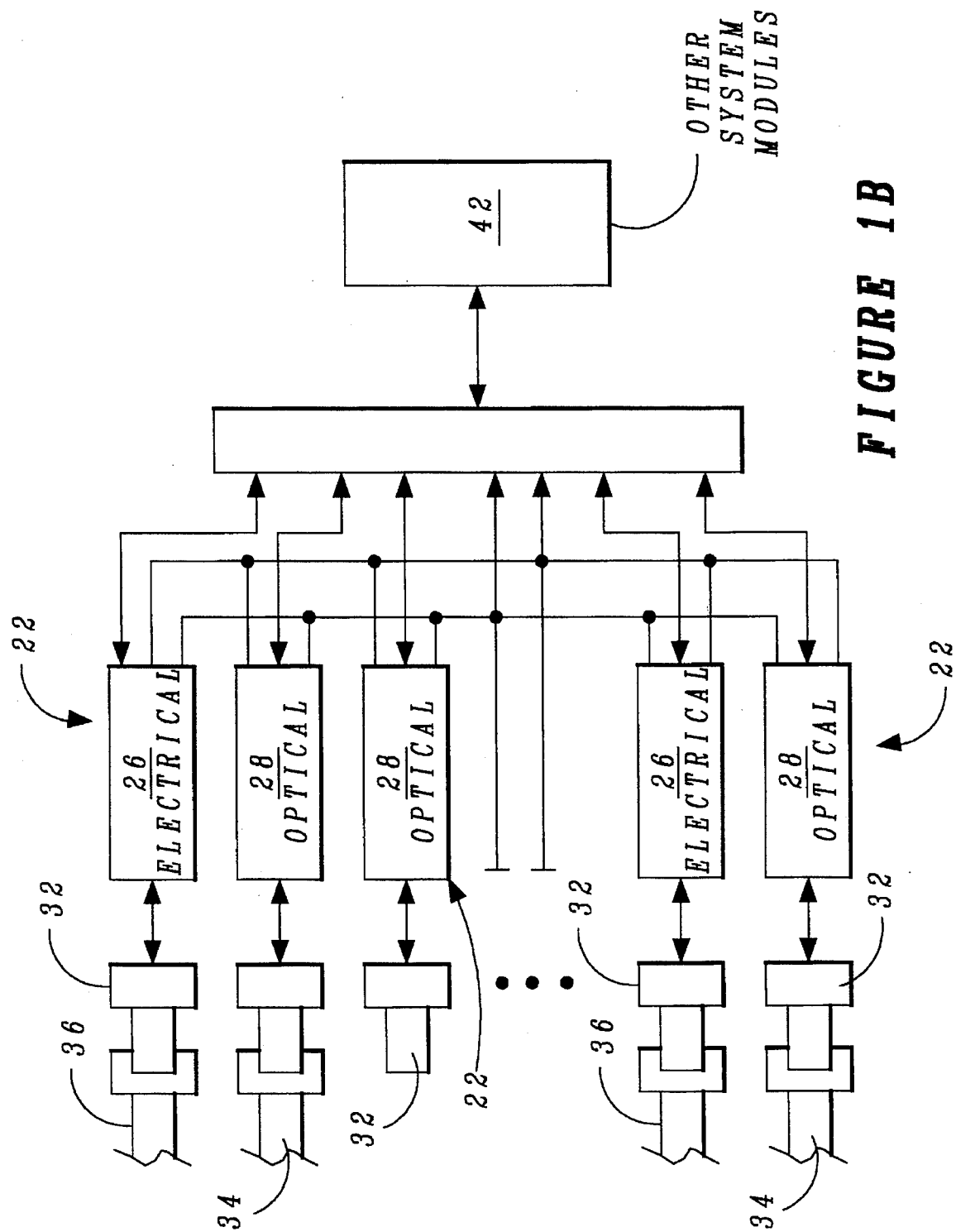
FIG. 1B is a block diagram of the input/output module of the present invention.

Reference is now made to FIGS. 1A and 1B, wherein FIG. 1A shows a top, partially broken away view of the circuit board 12 for the input/output module 10 of the present invention, and FIG. 1B is a block diagram of the module 10. The circuit board 12 includes an internal ground plane 14 and an internal power plane 16, and is divided into a plurality of cells 18 schematically differentiated from each other by broken lines 20. Each cell 18 includes the requisite circuitry 22 (schematically shown at 24 in FIG. 1A) for interfacing the individual cells of the module 10 to either an optical or an electrical transmission media such as a fiber optic or coaxial cable or communications link. The interface circuitry 22 is connected to the internal ground plane 14 and power plane 16.

The interface circuitry 22 comprises circuit means for facilitating the input/output of electrically transmitted digital signals (circuitry 26), or the input/output of optically transmitted digital signals (circuitry 28) as selected for each cell 18 of the input/output module 10 and necessitated by its use in a particular application. The module 10 may be constructed to include as much or as little of each type of input/output functionality (i.e., optical versus electrical) as desired. All input or all output with mixed optical and electrical interface functionality may also be specified if necessitated by the application (see, FIG. 2 and description herein). Accordingly, it will be understood that the identification of certain ones of the cells 18 in FIG. 1 as having the circuit means 26 or 28 providing designated interface functionalities is by way of illustration only, and that the interface functionalities provided by the circuitry 22 may be selectively included and specially chosen as needed for each individual module 10 in accordance with a given application.

Each cell 18 further includes an associated interface connector 32 mounted to a rear edge 33 of the circuit board 12. The connectors 32 may be of different types as needed for connection to different types of optical transmission lines, links or cables 34 or different types of electrical transmission lines, links or cables 36. Each interface connector 32 is connected only to the interface circuitry 22 for its associated cell 18. The circuitry 22 for each cell 18 is further connected through microstrip lines 38 to designated pins of an inter-module connector 40 provided for interconnecting the cells of the module 10 to the cells of other input/output modules 10 or to other communications system component modules 42. As shown in the side view of FIG. 3, the connections via the intermodule connector 40 are made either directly to another similar mating connector 44 or indirectly to another non-mating connector 46 through an internal interconnect circuit board or cable 48. The internal ground plane 14 and power plane 16 are connected to receive power through the inter-module connector 40.

With the foregoing configuration of the circuit board 12 for the module 10, the interface connectors 32 are positioned at the edge of the circuit board to simplify installation of the module and hook-up of both optical and electrical transmission lines, links or cables 34 and 36, respectively. Furthermore, this module configuration positions the circuit means 24 and 26 of the interface circuitry 22 proximate to the location of their associated interface connectors 32 giving the lines, links or cables 34 and 36 connected thereto direct access to the interface circuitry. This proximate positioning of the connectors 32 to the circuitry 22 further is important in order to facilitate the handling by the module 10 of high speed digital communications signals transmitted either optically or electrically.

Figure 2:
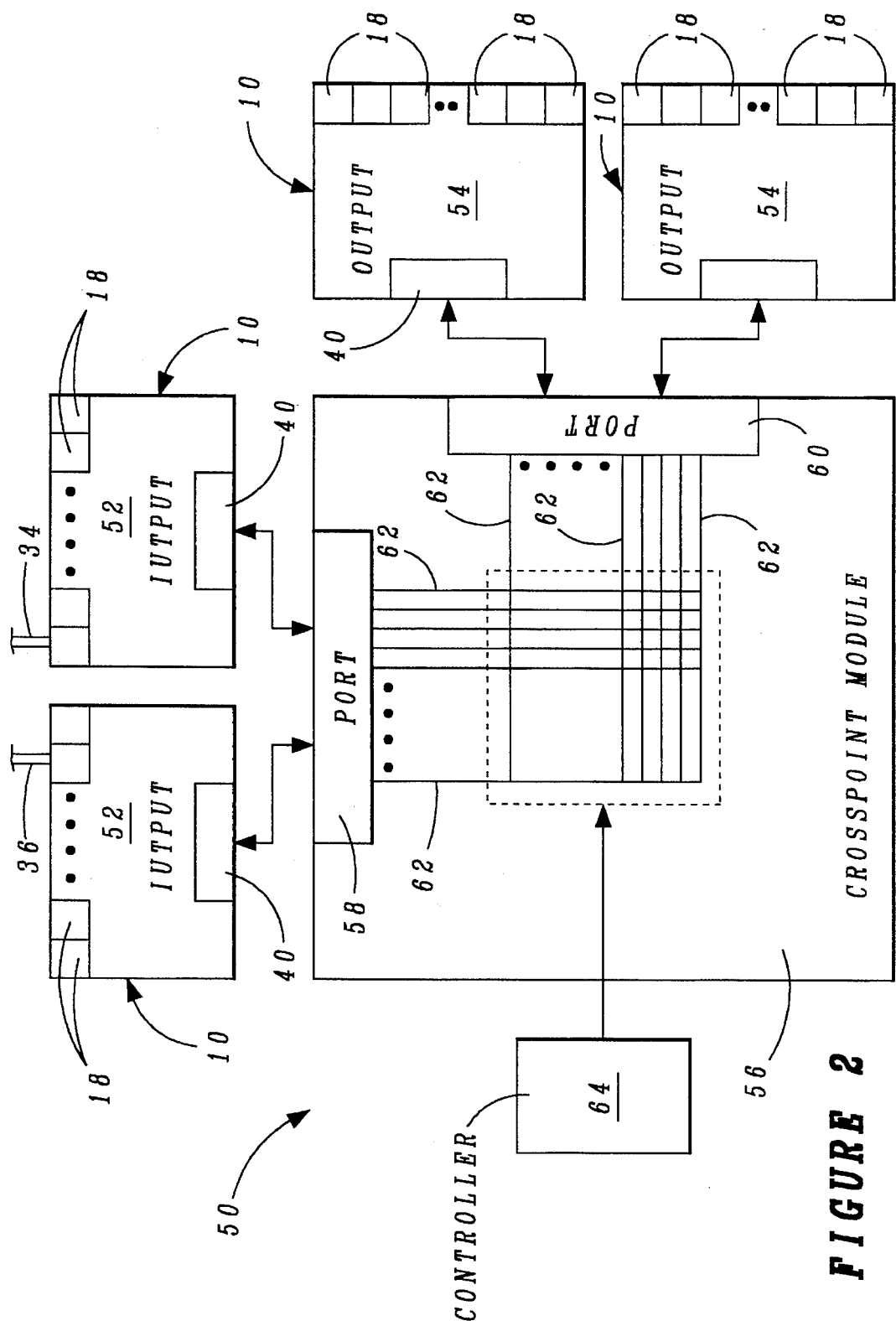
FIG. 2 is a block diagram of a communications system router incorporating the input/output module of the present invention.

Reference is now made to FIGS. 1A, 1B and 2, wherein FIG. 2 is a block diagram of a communications system router 50 incorporating a plurality of the input/output modules 10 of the present invention. The included modules 10 are configured to be either an input module 52 having circuitry 22 for providing mixed optical and electrical interface functionality with received communications signals, or an output module 54 having circuitry 22 for providing mixed optical and electrical interface functionality with transmitted communications signals. Thus, each cell 18 in the input modules 52 of the router 50 is configured for receiving either optically or electrically transmitted digital communications signals as specified by its interface circuitry 22. Furthermore, each cell 18 in the output modules 54 of the router 50, on the other hand, is configured for transmitting, either optically or electrically, digital communications signals as specified by its interface circuitry 22.

The router 50 further includes a crosspoint module 56 having a first port 58 connected to each of the included input modules 52, and a second port 60 connected to each of the included output modules 54. The connection of the first and second ports 58 and 60 of the router 50 to the input and output modules 52 and 54 is made through the inter-module connectors 40 provided on the circuit boards 12 of each module 10. This facilitates an efficient stacking of the circuit boards for the modules 10 and the circuit board for the router 50 as shown in FIG. 4 with the connectors 32 conveniently positioned to receive optical and electrical transmission lines, links or cables 34 and 36, respectively, giving the lines, links or cables 34 and 36 direct access to the interface circuitry 22.

The ports 58 and 60 in the module 56 are each comprised of multiple channels 62 corresponding to, or exceeding the number of cells 18 in the input or output modules 52 or 54, respectively. The crosspoint module 56 operates to selectively connect certain ones of the channels 62 connected to cells 18 of the input modules 52 to certain ones of the channels connected to cells 18 of the output modules 54. These channel connections are made under the direction of a controller module 64 to direct mixed optical and electrical communications signals received by the input modules 52 through the router 50 for generation of mixed optical and electrical signals output from the output modules 54.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An optical and electrical communications system, comprising:

a mixed optical and electrical input/output communications device, comprising:

a circuit board;

a plurality of first circuits, each first circuit mounted to the circuit board and including means for interfacing the communications device to receive or transmit electrical signals;

a plurality of first connectors mounted to the circuit board, each first connector associated with one of the first circuits for providing a mechanical connection that electrically connects that first circuit to an electrical communications cable carrying the electrical signals;

a plurality of second circuits, each second circuit mounted to the circuit board and including means for interfacing the communications device to receive or transmit optical signals;

a plurality of second connectors mounted to the circuit board, each second connector associated with one of the second circuits for providing a mechanical connection that optically connects that second circuit to an optical communications cable carrying the optical signals;

a third connector mounted to the circuit board; and electrical signaling links between the plurality of first and second circuits and the third connector; and a switching circuit connected to the plurality of first and second circuits of the input/output communications device through the third connector for switching signals among and between the first and second circuits for transmission over the electrical and optical communications cables.

2. The input/output communications device as in claim 1 wherein the electrical signaling links comprise a plurality of microstrip communications lines connecting the plurality of first and second circuits to the third connector.

3. The input/output communications device as in claim 1 wherein the switching circuit comprises an electrical signal communications router including a crosspoint module connected to the plurality of first and second circuits of the input/output communications device through the third connector.

4. A router for a communications system carrying both optically and electrically transmitted communications signals, comprising:

(a) an input module including:

first means for interfacing with a plurality of input communications cables to receive optically transmitted signals; and second means for interfacing with the plurality of input communications cables to receive electrically transmitted signals;

(b) an output module including:

first means for interfacing with a plurality of output communications cables to output optically transmitted signals; and second means for interfacing with the plurality of output communications cables to output electrically transmitted signals; and (c) a crosspoint module including:

an input port connected to the first and second means for interfacing of the input module;

an output port connected to the first and second means for interfacing of the output module; and switch means connected to the input and output ports for selectively interconnecting the first and second means for interfacing of the input module to the first and second means for interfacing of the output module to switch for output the optically and electrically transmitted communications signals received by the router.

5. The router as in claim 4 wherein the first and second means for interfacing of the input and output modules each define a plurality of communications channels, further including a controller connected to the crosspoint module for controlling the operation of the switch means to interconnect certain ones of the channels of the input module to certain ones of the channels of the output module.

6. The router as in claim 4 wherein the first means for interfacing in both the input and output modules comprises a plurality of optical interface circuits, each interface circuit including an optical connector for connecting to a fiber optic communications cable.

7. The router as in claim 4 wherein the second means for interfacing in both the input and output modules comprises a plurality of electrical interface circuits, each interface circuit including an electrical connector for connecting to a wire communications cable.

8. A device for processing both optically and electrically transmitted communications signals, comprising:

at least one optical-to-electrical interface circuit;

an optical connector for each included optical-to-electrical interface circuit configured to mechanically and optically connect the optical-to-electrical interface circuit with a designated type of optical communications cable;

at least one electrical-to-electrical interface circuit;

an electrical connector for each included electrical-to-electrical interface circuit configured to mechanically and electrically connect the electrical-to-electrical interface circuit with a designated type of electrical communications cable; and a communications switch including a crosspoint module connected to the optical-to-electrical and electrical-to-electrical interface circuits of the input/output device to switch signals therebetween.

\* \* \* \* \*